United States Patent [19]

Hale et al.

[11] Patent Number: 5,436,227
[45] Date of Patent: Jul. 25, 1995

[54] SOLUBLE/INSOLUBLE ALCOHOL IN DRILLING FLUID

[75] Inventors: Arthur H. Hale; Fersheed K. Mody, both of Houston, Tex.

[73] Assignee: Shell Oil Company, Houston, Tex.

[21] Appl. No.: 68,333

[22] Filed: May 27, 1993

[51] Int. Cl.$^6$ ............................................. C09K 7/02
[52] U.S. Cl. .................................... 507/136; 507/139
[58] Field of Search .................................. 507/136, 139

[56] References Cited

U.S. PATENT DOCUMENTS

| | | |
|---|---|---|
| 2,191,312 | 2/1940 | Cannon . |
| 2,207,348 | 7/1940 | Jones . |
| 2,822,873 | 2/1958 | Harmsen et al. . |
| 3,114,419 | 12/1963 | Perry et al. . |
| 3,368,900 | 2/1968 | Burg . |
| 3,380,831 | 4/1968 | Cohen . |
| 3,499,491 | 3/1970 | Wyant et al. . |
| 3,557,876 | 1/1971 | Tragesser . |
| 3,594,410 | 7/1971 | Cohen . |
| 3,964,921 | 6/1976 | Persinski et al. . |
| 4,163,809 | 8/1979 | McGinniss et al. . |
| 4,174,974 | 11/1979 | Fondriest . |
| 4,257,902 | 3/1981 | Singer . |
| 4,427,556 | 1/1984 | House et al. . |
| 4,481,258 | 11/1984 | Sattler et al. . |
| 4,547,298 | 10/1985 | Novak . |
| 4,560,812 | 12/1985 | Blytas . |
| 4,664,843 | 5/1987 | Burba, IIII et al. . |
| 4,674,574 | 6/1987 | Savoly et al. . |
| 4,722,947 | 2/1988 | Thanawalla et al. . |
| 4,722,976 | 2/1988 | Ceska . |
| 4,745,138 | 5/1988 | Thanawalla et al. . |
| 4,756,761 | 7/1988 | Philip et al. . |
| 4,760,882 | 8/1988 | Novak . |
| 4,762,625 | 8/1988 | Dadgar . |
| 4,788,220 | 10/1988 | Peterson . |
| 4,874,675 | 10/1989 | Ceska . |
| 4,897,119 | 1/1990 | Clarke . |
| 5,007,489 | 4/1991 | Enright et al. . |
| 5,020,598 | 6/1991 | Cowan et al. . |
| 5,058,679 | 10/1991 | Hale et al. . |
| 5,073,197 | 12/1991 | Majumdar et al. . |
| 5,076,373 | 12/1991 | Hale et al. . |
| 5,082,499 | 1/1992 | Shen . |
| 5,083,622 | 1/1992 | Hale et al. . |
| 5,084,102 | 1/1992 | Brouns et al. . |
| 5,091,349 | 2/1992 | Alpert et al. . |
| 5,099,930 | 3/1992 | Enright et al. . |
| 5,106,422 | 4/1992 | Bennett et al. . |
| 5,133,806 | 7/1992 | Sakamoto et al. . |
| 5,161,470 | 11/1992 | Dobozi et al. . |
| 5,166,109 | 11/1992 | Alpert et al. . |
| 5,168,008 | 12/1992 | Yoshida et al. . |
| 5,358,044 | 10/1994 | Hale et al. ............................ 507/136 |
| 5,361,841 | 11/1994 | Hale et al. ............................ 507/139 |

FOREIGN PATENT DOCUMENTS

| | | |
|---|---|---|
| 58-144069 | 10/1983 | Japan . |
| 59-103767 | 8/1984 | Japan . |
| 23630 E/12 | 4/1979 | U.S.S.R. . |

*Primary Examiner*—Philip Tucker

[57] ABSTRACT

A method for drilling utilizing a composition comprising water, a water-soluble polyalcohol, a water-insoluble alcohol, and drill solids. Also, a composition ideally suited for drilling is provided comprising water, a mixture of water-soluble and insoluble alcohols and drill solids.

3 Claims, No Drawings

SOLUBLE/INSOLUBLE ALCOHOL IN DRILLING FLUID

BACKGROUND OF THE INVENTION

This invention relates to drilling boreholes.

The drilling of boreholes is generally carried out using a rotary drilling process. The rotary drilling of a borehole is accomplished by rotating a drill string having a drill pipe and a drill bit at its lower end. Weight is applied to the drill bit while rotating to create a borehole into the earth. The drill string is hollow and sections are added to the drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these necessities are accomplished by the circulation of a fluid down through the drill string and up to the surface between the drill string and the wall of the borehole.

As the drilling proceeds through the various formations being traversed by the borehole, there are varying degrees of problems encountered because of the porosity of the formations and instability of shale that may be encountered. Drilling fluid density is typically controlled so as to provide sufficient fluid pressure to prevent inflow of fluids from the formation. The pressure must, however, be maintained low enough not to cause harmful rupture of the formation. Nonetheless, there is generally loss of fluid from the drilling fluid which normally results in the laying down of a filter cake of solids from the drilling fluid onto the borehole walls. It is desirable to keep this fluid loss low and thus lay down a relatively thin filter cake. Excessive fluid loss results in waste of drilling fluid, contamination of the formation and the production of a thick filter cake that may adversely affect the integrity of any subsequent cementing operation to secure a casing or liner.

Also, there is a chemical effect which is of equal importance in determining the effectiveness of the drilling fluid to perform its required functions without damaging the formation due to excessive mud weight pore pressure communication.

Peterson, U.S. Pat. No. 4,780,220 (Oct. 25, 1988) discloses glycerine, polyglycerine, or mixtures thereof in drilling fluids to serve as a lubricant, reduce filtrate, control flow properties and minimize sloughing shale problems. Cannon, U.S. Pat. No. 2,191,132 (Feb. 20, 1940) discloses a polyhydroxy alcohol or saccharose to drilling fluid to minimize shale disintegration. Enright et al, U.S. Pat. No. 5,007,489 (Apr. 16, 1991), discloses a drilling fluid having a water-insoluble polyglycol and a surfactant composition to control bit balling.

SUMMARY OF THE INVENTION

It is an object of this invention to provide a drilling fluid having enhanced capability for preventing fluid loss.

It a further object of this invention to provide a drilling fluid which lowers mud weight pore pressure communication so as to reduce shale disintegration.

In accordance with this invention a drilling fluid is provided comprising water, drill solids and a mixture of a polyhydroxy water-soluble alcohol and a water-insoluble alcohol.

DETAILED DESCRIPTION OF THE INVENTION

It has been found that a mixture of a water-soluble polyalcohol and a water-insoluble alcohol gives significantly better fluid loss control and mud weight pore pressure communication reduction than either alcohol alone.

Definitions

By "soluble", is meant a polyalcohol, generally containing ether linkages, which is sufficiently soluble in water at room temperature that at least 80 grams will dissolve in 100 grams of water. Lower molecular weight and/or a lower ratio of ether to alcohol groups tends to give more soluble polyalcohols.

By "insoluble", as it relates to alcohols, is meant a material containing alcohol and generally ether linkages which, primarily because of a high ratio of ether to alcohol linkages, or hydrocarbon chains from dihydric monomers, is substantially insoluble in water at room temperature. Higher molecular weight also tends to make the alcohols more insoluble. Conversely, those with a lower ratio and/or lower molecular weight are soluble. Hence, insoluble as used herein in connection with alcohols means alcohols which are not water-soluble as defined herein.

By "cuttings" stabilizer is meant a material which inhibits disintegration of cuttings which is indicative of a wellbore or shale stabilizer.

By "borehole stabilizer" or "wellbore stabilizer" is meant an additive or system of additives that reduces the stress state of the wellbore and/or modifies the wellbore such that strength of the formation is enhanced.

By "shale stabilizer" is meant an additive or additive system which stabilizes cuttings which is indicative of the ability to stabilize a borehole (wellbore).

As used herein "down" or "in" as it relates to a drill string or casing means in a direction toward the farthest reach of the borehole even though in some instances the borehole can be disposed in a horizontal position. Similarly, "up" or "out" means back toward the beginning of the borehole.

Drilling Fluid Composition

The drilling fluid comprises:
a) an aqueous medium,
b) a water-soluble polyalcohol,
c) a water-insoluble alcohol
d) drill solids
e) generally a rheology control agent (viscosifier),
f) optionally, a secondary fluid loss additive,
g) optionally, a weight material (as needed),
h) optionally, a secondary shale stabilizer (as needed),
i) optionally, a deflocculant (as needed).

Aqueous Medium

The term "aqueous medium" is intended to encompass both fresh water and salt water, including any fluid having water as the continuous phase, including oil-in-water emulsions, as well as essentially oil-free water based drilling fluids.

The liquid medium can also be an oil external, water internal emulsion, i.e., an invert emulsion.

It is generally desired that the water based drilling fluids use water containing dissolved salts, particularly sodium chloride. In these instances, 0.1 to 26 wt%, preferably 3 to 20 wt% sodium chloride based on the weight of the continuous phase may be used. One suitable source is to use seawater or a brine solution simulating seawater although in some instances a higher concentration, i.e., 5–20 wt%, is desired. Various salts, including organic salts, are suitable for use in the drilling fluid used in this invention in addition to, or instead of NaCl, including, but not limited to, NaBr, KCl, $CaCl_2NANO_3$, $NaC_2H_3O_2$, $KC_2H_3O_2$, $NaCHO_2$, $CsCHO_2$ and $KCHO_2$. Sodium chloride is usually preferred, as noted above. These salts can be used, if desired, from 0.1 wt% up to the saturation point under the conditions employed.

The use of a salt solution such as seawater is particularly advantageous because salts such as sodium chloride act as a shale stabilizer in the drilling fluid in addition to enhancing the strength of the cement as noted hereinabove.

The water internal phase of the invert emulsions can also have such salt content, although generally it will not.

The salt modification of the aqueous phase to lower the water activity and increase the ionic strength results in stabilized cuttings as well as actual wellbore stabilization.

The drilling fluids of this invention can be converted to cements as disclosed in Hale and Cowan, U.S. Pat. No. 5,058,679 (Oct. 22, 1991) the disclosure of which is hereby incorporated by reference. The strength of the resulting cement is actually enhanced by the salt which is contrary to what would be expected in view of the intolerance of Portland cement to brine.

Alcohols

Suitable polyalcohols include polyols having at least two carbon atoms and two hydroxyl groups but no more than 18 carbon atoms and 13 hydroxyl groups. Nonlimitative examples of such polyalcohols include (carbon chains may be straight chains, branched chains, aromatic, or alicyclic), ethylene glycol, diethylene glycol, 1,2-propanediol, 1,3-propanediol (propylene glycol), neopentyl glycol, pentaerythritol, 1,6-hexanediol, glycerol, open and cyclic condensation products of glycerol (and/or other polyalcohols) such as diglycerols, triglycerols, tetraglycerols, pentaglycerols, and hexaglycerols, polyethylene glycols, polypropylene glycols, ethylenepropylene glycol, polyethylenepropylene glycols, ethylenepropylene glycol copolymers and ethylenebutylene glycol copolymers and ethylenebutylene glycol copolymers, 1,5,6,9-decanetetrol, 1,1,4,4-cyclohexanetetramethanol, 1,2,4,5-cyclohexanetetramethanol, 1,4-cyclohexanedimethanol, 1,3-cyclopentanedimethanol, 1,2,4,7-heptanetetrol, 1,2,3,5-heptanetetrol, 1,5,8-nonanetriol, 1,5,9-nonanetriol, 1,3,5,9-nonanetetrol, 1,3,5-heptanetriol, 2,4,6-heptanetriol, 4,4-dimethyl-1,2,3-pentanetriol, 1,1,3-cyclohexanetrimethanol, 1,3,4-cycloheptanetriol, 1,1-cyclopropanediol, 1,2-cyclopropanediol, 1,2,3-cyclopropanetriol, 1,1-cyclopropanedimethanol, 1,2-cyclopropanedimethanol, 1,2,3-cyclopropanetrimethanol, 1,1-cyclobutanediol, 1,2-cyclobutanediol, 1,3-cyclobutanediol, 1,2-cyclobutanedimethanol, 1,2,3-cyclobutanetriol, 1,2,4-cyclobutanetriol, 1,2,3,4-cyclobutanetetrol, 1,3-dimethyl-1,2,3,4-cyclobutanetetrol, 1 hydroxy cyclobutanemethanol, 2-methyl-1,2-butanediol, 2-methyl-1,2-butanediol, 3-methyl-2,2-butanediol, 1,2-pentanediol, 1,3-pentadiol, 1,4-pentanediol, 2,3-pentanediol, 2,4-pentanediol, 1,2,3-pentanetriol, 1,2,4-pentanetriol, 2,3,4-pentanetriol, 1,1-cyclopentanediol, 1,2-cyclopentanediol, 1,3-cyclopentanediol, 1,2,3-cyclopentanetriol, 1,2-hexanediol, 1,3-hexanediol, 1,2,3-hexanetriol, 1,2,4-hexanetriol, 1,2,3,4-hexanetetrol, 1,1-cyclohexanediol, 1,2-cyclohexanediol, 1,4-cyclohexanediol, 1,2,4-cyclohexanetriol, 1,2,5-cyclohexanetriol, 1,2,3,4-cyclohexanetetrol, 1,2,3,5-cyclohexanetetrol, and mixtures thereof.

Cyclic Polyol Production

A general chemical composition formula, disregarding the order, of one class of the polyols is as follows:

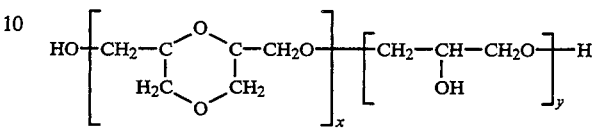

where $x \geq 1$ and $y \geq 0$.

As a specific example, x=2 and y=5. Polyethercyclicpolyols having a ratio of x:y within the range of 5:2 to 1:10 represent a presently preferred class of soluble polyols. Soluble polyetherpolyols with a relatively high weight average ($M_w$) molecular weight (in excess of 50,000) are also preferred in some instances. The ether-to-alcohol ratio is given by the following formula (for polyetherpolyols produced from glycerol):

$$e = \frac{3x + y - 1}{y + 2}$$

where e=the ratio, x=the number of rings and y=the number of glycerol molecules incorporated into the molecule that are not in the ring structure. If x=0 then the ratio various from 0.25 to a value approaching 1. Preferably x is not 0, i.e., preferably the polyol is a polyethercyclicpolyol. A typical e range for such polyalcohols is 1.4 to 1.8. The sum of 2x +y yields the number of glycerol monomers constituting the polymer.

A more complete description of these polyethercyclicpolyols is found in Hale and Cowan, U.S. Pat. No. 5,058,679 (Oct. 22, 1991), the disclosure of which is incorporated herein by reference.

Broadly, the reaction involves heating a polyol with at least three hydroxyl groups, at least two of which are adjacent each other, with removal of water to form a condensed product.

With glycerol as the primary reaction medium, it is preferable to remove at least 1.05 and more preferably, at least approximately 1.12 but no more than 1.2 moles of water per mole of glycerol. Most preferably, 1.12 to 1.15 moles of water per mole of glycerol in the product should be removed. If the feed contains an appreciable amount of predehydrated glycerol polymers, then the remaining dehydration will be less than 1.2 moles per mole of glycerol. As an example, for a known commercial product which typically contains 15 percent by weight of bis(hydroxymethyl)-dioxanes, and 85 percent by weight of glycerol, the dehydration can be calculated as follows. For approximately 100 grams of feed there are 85 grams of glycerol (0.92 moles) and 15 grams of bis(hydroxymethyl)-dioxane (0.1014 moles). The glycerol component will have to lose 0.92×1.2=1.104 moles of water. The 0.1014 moles of bis(hydroxymethyl)-dioxane is derived from 0.2028 moles of glycerol by removal of 0.2028 moles of water; 1.2 total moles water per mole of glycerol should be removed, i.e., 0.2028×1.2=0.2434 moles. Thus, it is necessary to remove 0.2434 −0.2028=0.0406 moles of water. The total to be removed is 1.104 moles from the glycerol+0.0406 moles from the bis(hydroxymethyl)-dioxane= 1.1496 moles water (or approximately 1.15 moles) from the 100 grams of the known commercial product.

Therefore, it is necessary to remove close to 1.2 moles of water for each mole of glycerol which enters into the condensation of an initially partially dehydrated glycerol feed stream. Alternatively, in most cases involving complex feed streams, it would be appropriate to carry out the reaction and select a final maximum reaction temperature at set pressure conditions, such as is known from previous experience to yield satisfactory polyethercyclicpolyol preparations.

From 5 to 35 wt% of the polyol can be replaced with a dihydroxy alcohol if it is desired to make a less water-soluble product. Suitable dihydroxy alcohols include those having 2 to 18 carbon atoms, preferably those having 4 to 14 carbon atoms. Suitable dihydroxy alcohols include ethylene glycol, propylene glycol, diethylene glycol and triethylene glycol, for instance.

The solubility in water is a function of molecular weight, the presence or absence of long chain dihydric alcohol units, and ether units, with either higher molecular weight, long chain dihydric alcohols or higher ether ratios, or all three, giving more insoluble polyols.

Epoxy-containing Cyclic Polyetheralcohols

In some instances it may be desirable to use a polyol containing paraffinic and/or aromatic groups linked by ether linkages to the polyol structure, these ether linkages having their origin in glycidyl ether or epoxy groups. Such polyols can be produced as disclosed in said Hale and Cowan patent for polyethercyclicpolyols generally except an epoxy resin is incorporated by reaction. Specifically, they can be produced by:

(a) heating a reaction mixture comprising a reactant selected from the group consisting of (1) a polyol having at least three hydroxyl groups of which at least two of the hydroxyl groups are vicinal, (2) precursors of the polyol, (3) cyclic derivatives of the polyol, and (4) mixtures thereof, said heating initiating the thermal condensation:

(b) removing water formed during the thermal condensation; and (c) prior to the condensation going to completion, admixing an epoxy resin with the reaction mixture.

Epoxy resins are characterized by the presence of a three-membered cyclic ether group commonly referred to as an epoxy group, 1,2-epoxide, or oxirane. Preferred epoxy resins are diglycidyl ethers, triglycidyl ethers, tetraglycidyl ethers, as well as multifunctional glycidyl ethers with more than four epoxy rings which, in the reacting glycerol or polyol medium, result in the formation of higher molecular weight polyethercyclicpolyols with substantially improved properties in connection with drilling fluid performance.

A particularly useful epoxy is a difunctional glycidyl ether such as "EPON 828" (a trademark of Shell Oil Company) which significantly increases the number average ($M_n$) molecular weight of a significant fraction of the polyethercyclicpolyols preparation. While not wishing to be bound by theory, addition of 3 weight percent of "EPON 828" could result in doubling the molecular weight of between 10 and 20 percent of the preparation. By thus increasing the molecular weight of a significant portion of the preparation, the copolymerization of "EPON 828" results in significantly boosting the $M_w$ value of the sample, with attendant significant improvements in the performance of the resulting polyethercyclicpolyols polymer/polyethercyclicpolyols diglycidyl ether copolymer mixture.

In order to obtain polyethercyclicpolyols with maximum coverage potential, it is suitable to use tri- and tetraglycidyl ethers which will direct polymerization along more than one direction in a planar configuration. It is theorized, although the invention is not limited to this theory, that the use of such epoxies facilitates the coverage of openings in the clay surface of an oil well through which water can enter the clay. While applicants do not wish to be bound by theory, it is believed that molecules which are substantially planar in structure are most useful with the invention when it is employed as part of a drilling fluid additive. Additionally, the attachment of several polyethercyclicpolyols onto the same central molecule of polyglycidyl ether, allows multiple coordination of cationic species to occur through the electron donating oxygen atoms in the ether linkages, which results in formation of large molecular aggregates that can inhibit the migration of water molecules from the aqueous phase of the water-based drilling mud onto the hydrophilic clay solids of the formation. Water-based drilling muds containing polyethercyclicpolyols act essentially in a manner similar to that of oil-based muds. This theory, of course, is not limiting of the application of this invention.

Experimental results have shown that the impact of using multifunctional glycidyl ethers on the values of $M_w$ and on the performance, particularly as regards swelling of clays when the epoxy-containing polyols are used as a drilling fluid additive, is truly significant. Thus, when using 3 weight percent "EPON 828" and 3 weight percent "EPON 1031" (trade names of Shell Oil Company), the values are correspondingly 78,015 and 151,000, and the swelling inhibition is the highest with "EPON 1031", with good performance also observed on inhibition of fluid loss and dispersion.

Although the observation of bimodal distribution of molecular weights in GPC (three-column chromatography) does not require the presence of epoxies, nevertheless, incorporation of epoxies into the polyethercyclicpolyols structure has a significant impact on the relative amounts of "large" molecules in the polyethercyclicpolyol production, increasing the ratio of large volume molecules/small volume molecules.

The following epoxies are considered useful in the present invention:

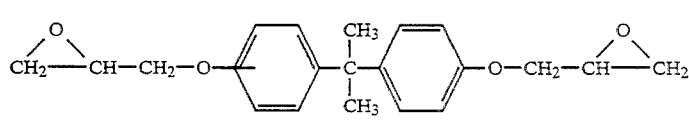

"EPON 828"

(trade name for epoxy manufactured by Shell Oil Company)

-continued

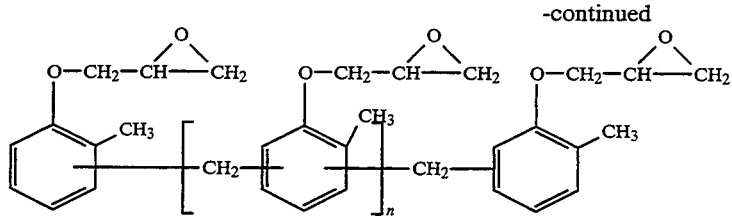

"EPON DPS 164"
(trade name for epoxy manufactured by Shell Oil Company)

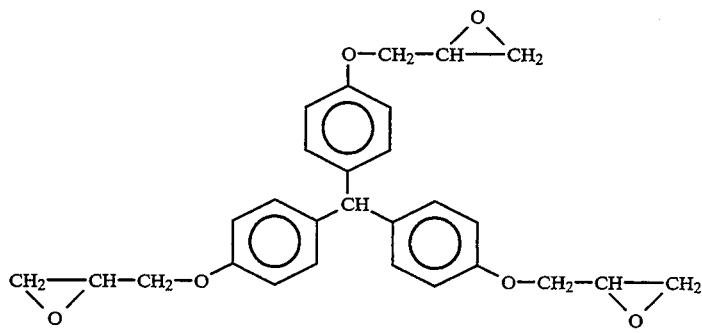

"TACTIX 742"
(trade name for epoxy manufactured by Dow Chemical Company)

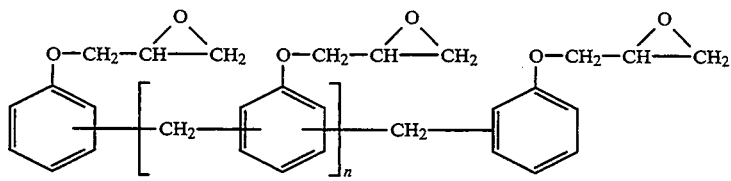

"NOVOLAC"
(trade name for epoxy manufactured by Shell Oil Company)

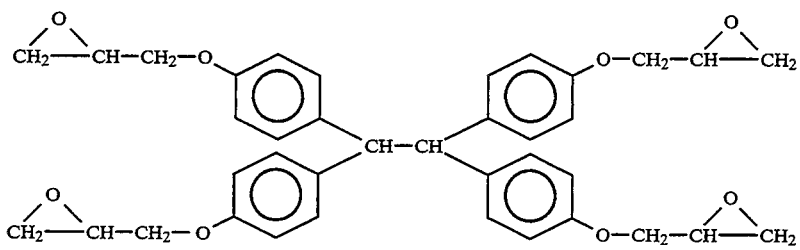

"EPON 1031"
(trade name for epoxy manufactured by Shell Oil Company)

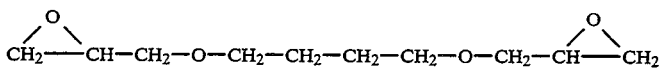

"HELOXY 67"
(trade name for epoxy manufactured by Rhone-Poulenc)

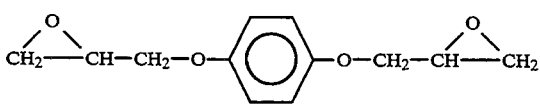

"HELOXY 69"
(trade name for epoxy manufactured by Rhone-Poulenc)

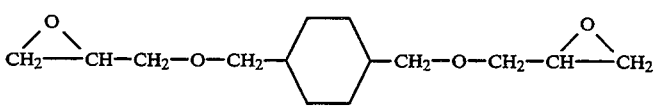

"HELOXY 107"

(trade name for epoxy manufactured by Rhone-Poulenc)

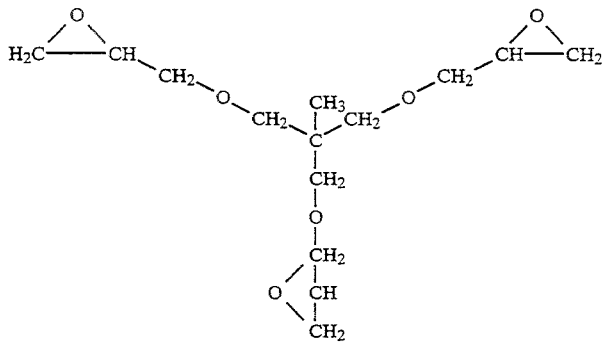

"HELOXY 5044"
(trade name for epoxy manufactured by Rhone-Poulenc)

With respect to "EPON 828", it is preferred to add the material in a plurality of aliquots, generally two or three aliquots, generally observing the layered addition until about 40 to 50 percent of the reaction is complete.

With "EPON 1031", it is suitable to add all the material at the beginning of the condensation reaction. It is suitable to add a larger amount of "EPON 828" than of "EPON 1031" because of the lower molecular weight of "EPON 828". It is preferred to avoid adding "EPON 828" at temperatures in excess of 270° C., due to risk of premature polymerization. The addition of more volatile polyglycidyl ethers must be carried out with caution due to their potential toxicity and relatively higher volatilities.

The epoxy resin can be used in an amount sufficient to give 0.5 to 5 weight percent material from the epoxy resin incorporated in the epoxy polyethercyclicpolyol. Alternatively, a relatively high epoxy content can be utilized, say 6 to 67, preferably 15 to 40 wt %. Thus, viewed in terms of the polyol, the epoxy component content can vary from 0 to 67 wt% based on the total weight of the polyol. In utilities where shale stabilization is the primary consideration, high epoxy content is preferred. In other instances, low epoxy content may be preferred.

The initial pressure can be higher when making the high epoxy content polyols as compared with the initial pressure preferred for the low epoxy. For instance, the initial pressure can be greater than 180 torr. Generally, the initial pressure will be between 250 and 500, preferably 250–350 torr, when the starting polyhydric alcohol component is glycerine. The initial temperature is generally between about 175° and 275° C., preferably between 200 and 260° C., more preferably between 210° and 250° C.

If desired, the reaction can be terminated before 1.07 moles of water are removed per mole of polyol reactant. Preferably, the polyhydric alcohol monomer is introduced into the reaction zone in a single addition and the epoxy introduced in a plurality of additions, preferably 2 to 10, most preferably 3 to 6 when utilizing the higher epoxy. Generally, if higher epoxy content materials are being produced, more additions are utilized and the addition of the epoxy could be continuous.

During the course of the reaction the temperature with the preferred glycol, glycerol, is generally increased to a range of 250°–300° C., preferably 251°–280° C., more preferably 260°–273° C. at essentially the initial pressure. Thereafter, the temperature is increased to 260°–310° C., preferably 261°–300° C., more preferably 280°–287° C. at a pressure of less than 180, more preferably 40–130 mmHg.

Ethoxylated Propoxylated Alcohols

Another preferred class of the polyalcohols is ethoxylated propoxylated alcohols of the following general formula

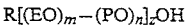

$$R[(EO)_m-(PO)_n]_z OH$$

where
EO=an ethoxy unit
PO=a propoxy unit
R=an alkyl chain of 2–16 carbon atoms, preferably 3–16, most preferably 4–10 carbon atoms.

At least one of m or n is greater than 0. In these EO/PO copolymers m and n are variable and the sum of m plus n determines their number average molecular weight, which ranges from 500 to 15,000, preferably from 600 to 10,000.

The m/n ratio determines the hydrophobic/hydrophilic balance (HLB), water solubility and nonionic surfactant properties of the copolymer. Solubility depends on the ionic strength of the aqueous medium (higher ionic strength results in lower solubility) and temperature. The temperature relationship is in a sense an inverse relationship since at higher temperatures the polyalcohols exhibit a cloud point and at lower temperatures they go back into solution. High temperatures in some systems has the same effect as high salt solutions. Thus, these too can be either the soluble or insoluble component of this invention and can be used in any combination with each other or the other alcohols described (i.e., soluble polyethercyclicpolyol/insoluble ethoxylated propoxylated alcohol; soluble ethoxylated propoxylated alcohol/insoluble polyethercyclicpolyol).

Polyalcohol Function

Soluble polyalcohols work in a similar way to the salt in that they lower water activity and bind to the clay so as to reduce the amount of hydration. In addition high molecular weight soluble polyalcohols may reduce the communication between the formation pore pressure and the hydrostatic pressure due to mud weight. Both mechanisms are advantageous in terms of cuttings stability and actual wellbore stability. Thus, the polyalcohol acts in combination with the salt to give particularly good shale stabilization.

While Applicants do not wish to be bound by theory, it is believed the insoluble (essentially insoluble, there is some wetting of the insoluble alcohol by the soluble alcohols) alcohols function primarily by a plugging action whereby they prevent mud weight/formation pore pressure communication (through the action of micelles which are formed which plug pore entrances). This is not just a simple mechanical plugging, however. The alcohol groups bind to the clay structure. The combination of soluble and insoluble alcohols results in better wetting of the insoluble alcohols and thus better delivery to the pore throats. This is independent of the soluble alcohols beneficial functions previously discussed. Also, in systems having both salt and polyalcohol, the benefits of both are still obtained.

If the pore throats are large enough, the soluble alcohol will bind to the clay particles in the shale and reduce hydration. The same reaction is the reason that the polyalcohol enables high solids tolerance in the drilling fluid. Binding and coating the solids (clays, formation solids and other loose drilling fluid solids) lowers the particle-to-particle interaction which lowers the viscosity.

Again, while not wishing to be bound by theory, applicants believe wellbore stability is enhanced because these materials form micelles which micelles plug pore entrances.

Thus, density alone does not determine the effectiveness of a drilling fluid in maintaining sufficient pressure to counterbalance the formation pressure. There is also a chemical effect.

The polyalcohols may lower mud weight pore pressure communication so the mean effective stress is not lowered in the formation. Thus pore pressure is not increased and thus borehole instability is reduced. While not wishing to be bound by theory, it is believed the soluble alcohol in solution binds water in the drilling fluid which lowers the water activity of the drilling fluid, i.e., lowers the molar free energy of the solution. The resulting molar free energy of the water in the drilling fluid compared with that in the formation results in a chemical stabilization of the wellbore by not increasing the formation pore pressure or possibly lowers the pore pressure, thus keeping the stress state of the wellbore such that it does not exceed the strength of the formation.

While not wishing to be bound by theory, applicants believe the fluid loss prevention comes about indirectly. The polyalcohol has a wetting capability and absorbs onto polymers and/or clay in the drilling fluid and perhaps otherwise modifies the drilling fluid, thus improving the fluid loss capability of the additives in the system. The polyalcohols also tend to improve bonding of the cement to the casing or liner and to the wellbore.

Broadly, any combination of (a) cyclic or non-cyclic soluble polyalcohols including cyclic polyalcohols with no epoxy, low epoxy or high epoxy (or any mixture of these soluble polyalcohols) can be used with (b) cyclic or non-cyclic insoluble alcohols including cyclic alcohols with no epoxy, low epoxy or high epoxy (or any mixture of these insoluble alcohols).

Fluid Loss Additive

The polyalcohols serve as fluid loss additives. A secondary fluid loss additive may also be used and if so, is generally selected from synthetic polymers such as biopolymers, starch and clay. The synthetic polymers are generally used in an amount within the range of 0.1 to 3, preferably 0.2 to 1 lbs/bbl of drilling fluid, the starch in an amount within the range of 2 to 15, preferably 5 to 10 lbs/bbl of drilling fluid, and the clay in an amount within the range of 2 to 50, preferably 5 to 30, more preferably 10 to 20 lbs/bbl of drilling fluid. The effect of these conventional fluid loss additives seems to be enhanced by the presence of the polyalcohol. Carboxymethyl cellulose can also be used although in the presence of salt, a higher concentration is needed (as compared with other polymers) to be effective.

Rheology Control

A rheology control agent in the context of a drilling fluid keeps solids from settling out and may be viewed as a viscosifier. Suitable viscosifiers include biopolymers and silicates. Starch can also function, generally in a secondary role, as a viscosifier. The starch, for instance, when used, is generally used in an amount within the range of 2 to 15, preferably 5 to 10 lbs/bbl of drilling fluid. All of the components, if used, are used in an amount effective to produce the desired effect, i.e., in this case, a sufficient increase in viscosity so that the mud will carry cuttings up out of the borehole.

Weight Material

The drilling fluid must be formulated to have the weight required for a particular drilling operation being conducted. The weight can be adjusted using conventional weighting agents such as barite (barium sulfate) or sufficient weight may be provided by the drill solids and/or soluble salts. The amount, if any, used would be the amount necessary to give the desired mud density. Other suitable weighting agents include titanium oxides such as $TiO_2$ and iron oxides such as hematite and ilmenite.

Shale Stabilizer

In some formations, the zones being drilled do not require stabilization. If shale stabilization is required, it is provided by the polyalcohol. Also, silicates, if present, and lime, if present, serve as secondary shale stabilizers. Finally, as noted above, in systems where the aqueous medium contains a salt, the salt acts as a shale stabilizer. Silicates, if present, are generally used in an amount within the range of 1 to 100, preferably 2 to 15, most preferably 5 to 10 lbs/bbl based on barrels of drilling fluid.

The silicates broadly encompass any silicate salt, or silicic acid which will form a salt in the drilling fluid. Alkali metal soluble silicates such as sodium silicate are preferred. Applicable silicates as exemplified by sodium silicate are those having a $SiO_2:Na_2O$ weight ratio within the range of 1.6 to 3.5.

Deflocculant

A deflocculant such as a carbohydrate polymer can be used if needed. Generally, deflocculants, if present, will be used in an amount within the range of 0.5 to 10 lbs/bbl of drilling fluid.

Clay/Drill Solids

Frequently, a clay such as bentonite or prehydrated bentonite will be present which provides fluid loss control in the drilling fluid. In some instances, however, drilling fluids which are initially clay-free (free of prehydrated bentonite, for instance) are preferred. The clay is frequently included in the initial drilling fluid and in any event will almost always be encountered during drilling and will become a part of the drill solids. Frequently, clay, prehydrated in fresh water, is used initially to give functions such as fluid loss control since the clay in a salt water environment does not hydrate readily and thus imparts less viscosity to the fluid. This is generally referred to as the "yield", i.e., the amount of viscosity imparted by the clay.

Ingredient Order

While the ingredients can be added in any order, there are two combinations where a significant improvement flows from the addition sequence. First, if a biopolymer and lime are used, the biopolymer should be added after the lime. This gives better yield, i.e., enhances viscosity imparted and fluid loss prevention capabilities. Second, polymers such as starch and biopolymers should be added before the alcohols to allow the polymers to hydrate before contact with the alcohols. This gives better hydration and thus better polymer extension (swelling).

Lime

As previously noted, preferred systems contain lime. These systems thus are analogous to conventional drilling fluids known as high lime, low lime, and low lime/salt. By "low lime" is meant a drilling fluid having about 0.5 to 3, generally 0.5 to 2.0 lbs of unreacted lime per barrel of drilling fluid. By "high lime" is meant a drilling fluid having from greater than 3.0 to 15 lbs of unreacted lime per barrel of drilling fluid. The low lime/salt fluids have about 1 to 4.0 lbs/bbl of unreacted lime and about 18 to 109 lbs/bbl of salt such as sodium chloride.

Ingredient Ratios

The concentration of the soluble/insoluble alcohol mixture in the water phase of the universal fluid of this invention will generally be from 1 to 50% by volume and preferably from about 3 to 30% by volume based on the volume of water, more preferably from 5 to 25% by volume, most preferably between 10 and 20% by volume.

The weight ratio of soluble:insoluble will be generally within the range of about 0.1:1 to 10:1, preferably 0.25:1 to 2:1, most preferably about 0.5:1 to 1:1.

EXAMPLE

This Example shows the effect of using a mixture of soluble and insoluble alcohols. The soluble alcohol (PECP) is a polycyclicpolyetherpolyol produced from glycerine of the type shown herein, wherein average $x=2.0$ and average $y=5.0$. The insoluble alcohol (PG) is a poly(propylene glycol) of high enough molecular weight to be insoluble. It is a material sold by Dow Chemical Company under the trade name "PG 4000".

The base mud with which the listed composition was combined was as follows:
20 lbs/bbl bentonite gel
25 lbs/bbl drill solids [1]
3 lbs/bbl starch
3 lbs/bbl synthetic polymer[2]
4 lbs/bbl MOR-REX[3]
0.5 lbs/bbl BIOZAN[4]

[1] Clay/quartz dust manufactured by MilWhite Corp. under the trade name REVDUST.
[2] Manufactured by SKW Chemicals Inc. under the trade name POLY-DRILL
[3] Trade name of Grain Processing Co. for water soluble carbohydrate polymer
[4] Trade of Kelco Oil Field Group Inc. for a biopolymer The salt in each instance was used in an amount of 20wt% based on the weight of the continuous phase. The lime was used in an amount of 4 lbs/bbl of drilling fluid.

| Mud Additive System | Percent[1] Alcohol | HPHT[2] (mls) | Predicted Additive Response (mls) | Actual Response (mls) | Percent Increase |
| --- | --- | --- | --- | --- | --- |
| Salt/Lime Control | 0 | 14 | | | |
| Salt/Lime Polypropylene Glycol | 14.9 | 12 | | | |
| Salt/Lime PECP | 6.7 | 10.8 | | | |
| Salt/Lime/ PECP/PG | 6.7/14.9 | 5.6 | 8.8 | 5.6 | 57.1 |

[1] Weight percent based on the weight of the continuous (fluid) phase.
[2] High temperature, high pressure fluid loss at 20° F. and 500 psi pressure differential.

As can be seen, the composition comprising soluble and insoluble alcohols (PECP/PG) gave better results than would have been predicted from the additive effects of each alone.

While this invention has been described in detail for the purpose of illustration, it is not to be construed as limited thereby but is intended to cover all changes and modifications within the spirit and scope thereof.

What is claimed is:

1. A method for drilling comprising:
   drilling a wellbore with a drill string comprising a drill pipe utilizing a drilling fluid comprising water, drill solids, a water soluble polyalcohol and water-insoluble alcohol; said soluble polyalcohol being a polyethercyclicpolyol of the formula:

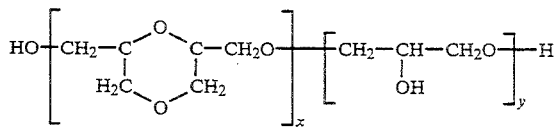

where $x \geq 1$ and $y \geq 0$, and said insoluble alcohol being a condensation product of glycerol and a dihydroxy alcohol.

2. A method for drilling comprising:
   drilling a wellbore with a drill string comprising a drill pipe utilizing a drilling fluid comprising water, drill solids, a water soluble polyalcohol and water-insoluble alcohol; at least one or part of one of said alcohols comprising an ethoxylated propoxylated polyol, and at least part of said soluble polyalcohol being a polyethercyclicpolyol of the formula:

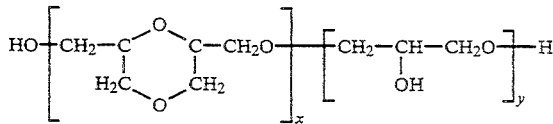

where $X \geq 1$ and $y \geq 0$.

3. A composition comprising:
   water, a water-soluble polyalcohol component, a water-insoluble alcohol component, drill solids; lime and sodium chloride;
   said water-soluble polyalcohol and water-insoluble alcohol components together comprising 3 to 30 volume percent of said composition based on the volume of said water and wherein the ratio of said water-soluble polyalcohol to said water-insoluble alcohol is within the range of 0.1:1 to 1:1; and
   said water-soluble polyalcohol component is a polyethercyclicpolyol and said water-insoluble alcohol component is a poly(propylene glycol).

* * * * *